Mar. 3, 1925.

H. A. HANDS 1,528,053

TEMPERATURE CONTROL SYSTEM

Filed July 11, 1922    2 Sheets-Sheet 1

WITNESSES:

INVENTOR
Howard A. Hands.
BY
           ATTORNEY

Mar. 3, 1925.   1,528,053
H. A. HANDS
TEMPERATURE CONTROL SYSTEM
Filed July 11, 1922   2 Sheets-Sheet 2
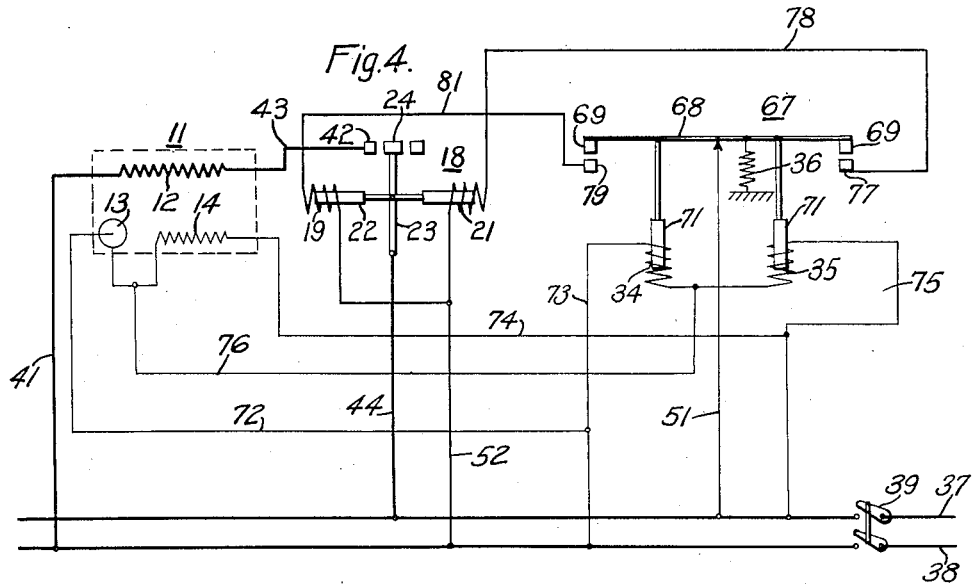
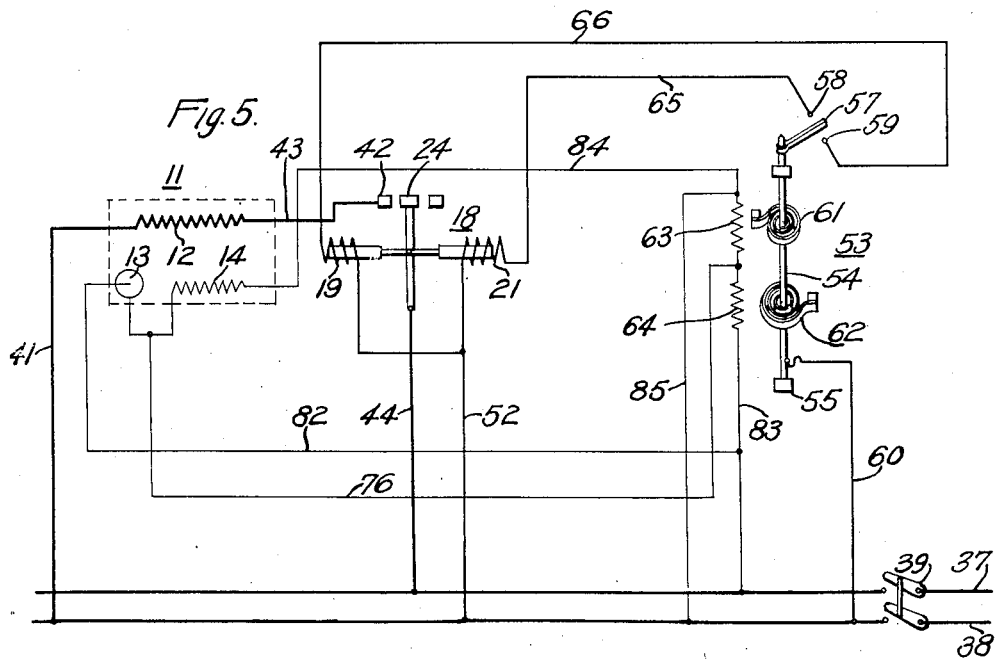
WITNESSES:
INVENTOR
Howard A. Hands.
BY
ATTORNEY Patented Mar. 3, 1925

1,528,053

UNITED STATES PATENT OFFICE.

HOWARD A. HANDS, OF SWISSVALE, PENNSYLVANIA, ASSIGNOR TO WESTINGHOUSE ELECTRIC & MANUFACTURING COMPANY, A CORPORATION OF PENNSYLVANIA.

TEMPERATURE-CONTROL SYSTEM.

Application filed July 11, 1922. Serial No. 574,250.

*To all whom it may concern:*

Be it known that I, HOWARD A. HANDS, a citizen of the United States, and a resident of Swissvale, in the county of Allegheny and State of Pennsylvania, have invented a new and useful Improvement in Temperature-Control Systems, of which the following is a specification.

My invention relates to control systems and, particularly, to temperature-control systems for electrically-heated devices.

The object of my invention is to provide a relatively simple and rugged system for controlling the temperature of electrically-heated furnaces and appliances.

In practicing my invention, I provide two variable-resistance resistor members thermally influenced by the heated furnace or appliance, one resistor member having a positive temperature coefficient of resistance and the other having a negative or a negligible temperature coefficient of resistance. The two resistor members are connected in series-circuit or in parallel-circuit relation to the magnet windings of a plural-position electro-magnetic relay or switch, or to a plurality of heating coils thermally controlling a plural-position relay actuated by a plurality of normally-balanced bi-metallic strips.

The relay or switch controls an electromagnetic-circuit-controlling means electrically connected to the heating element.

In the drawings,

Figs. 4 and 5 are diagrams of connections of further modifications of temperature-control systems embodying my invention.

Figure 1:
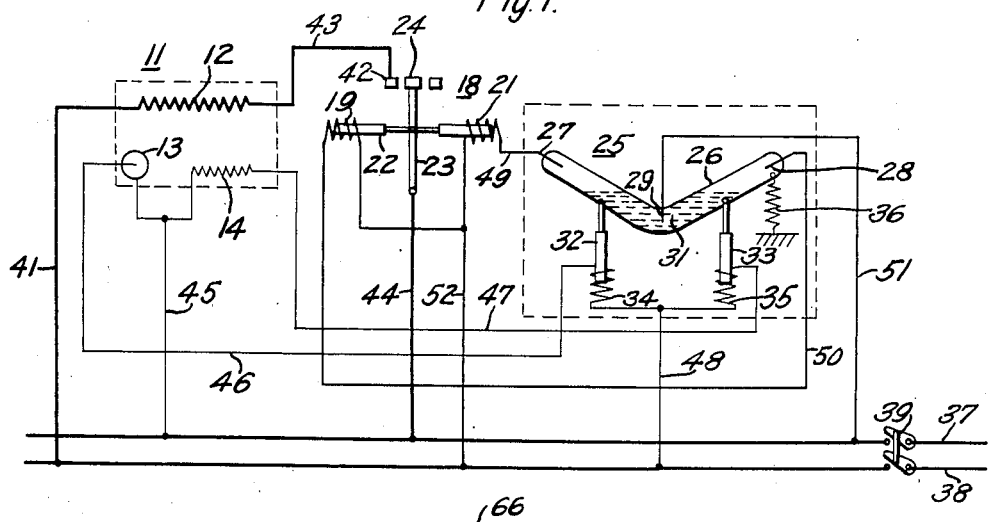
Figure 1 is a diagram of connections of a temperature-control system embodying my invention.

Referring more particularly to Fig. 1 of the drawings, I have indicated an electric furnace or other electrically-heated device or appliance by the numeral 11. An electric heating element 12 is operatively associated therewith, the supply of energy to which is to be controlled.

I provide a plurality of resistor members having variable resistance, respectively, and comprising a so-called "salt" thermostat 13 having a negative temperature coefficient of resistance, and a control resistor member 14 having a positive temperature coefficient of resistance, such as a nickel resistance wire or, if desired, the resistance of the member 14 may have a practically negligible temperature coefficient of resistance.

Figure 2:
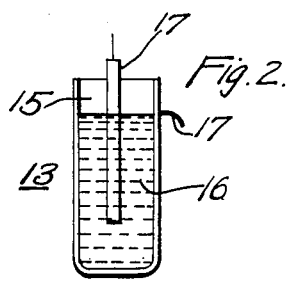
Figure 2 is a cross-sectional view of a variable resistance cell employed in my system.

The salt thermostat is more particularly illustrated in Fig. 2 of the drawings, and may comprise a relatively small tubular metallic container 15, which is partly filled with a suitable electrolyte 16, such as potassium nitrate. A terminal member 17 is suitably secured to the tubular member 15, and a second terminal member 17 is placed within the tubular member 15, operatively engaging the electrolyte 16. The operation of this variable-resistance cell may be briefly described as follows: At normal temperatures, the electrolyte 16 is substantially in a solid condition but fuses at a predetermined higher temperature. The electric resistance of the solid electrolyte is relatively very high, but this resistance becomes relatively very low as soon as the electrolyte fuses. If a source of electromotive force is connected to the cell and to a circuit to be controlled thereby, the current traversing the cell and the circuit is relatively very low at ordinary temperatures but increases very rapidly at and above a predetermined temperature, thereby permitting of operating an actuating member, as will be hereinafter set forth more in detail. This type of salt thermostat is more particularly disclosed and claimed in Patent No. 1,406,352, to P. E. Demmler, dated February 14, 1922.

A plural-position electromagnetically-operated switch 18 comprises two magnet windings 19 and 21, located in opposite spaced-apart relation and selectively controlling a two-part core member 22, secured to a pivotally-mounted rocking arm 23, which carries, at its free end, a contact member 24.

A relay member 25 comprises a tube 26 of a suitable insulating material, such as glass or quartz, bent to substantially V-shape, and having electric-circuit terminals 27 and 28, projecting into the tube through the wall adjacent the outer ends thereof, and an intermediate electric-circuit terminal 29 projecting into the tube at substantially the middle of its length. A quantity 31, of a suitable conducting fluid, such as mercury, is placed within the tube, which is so mounted by any suitable means not shown in the drawings, as to have a turning movement on a transverse axis thereof. Magnetizable core members 32 and 33 are operatively connected to the two legs of the tube 26 and are selectively attracted by magnet windings 34 and 35, respectively. A spring member 36 may be connected to one end portion of the tube 26 to maintain the tube in its neutral position, substantially as illustrated in Fig. 1 of the drawings although this is not an essential requirement.

A supply-circuit comprises two conductors 37 and 38, a manually-operable switch 39 being provided to permit of controlling the energization of the entire system. One end of the heating element 12 is connected to the supply-circuit 38 by a conductor 41, while the other end of the heating element 12 is connected to a stationary contact terminal member 42 by a conductor 43. The member 42 is so located as to be operatively engaged by the movable contact member 24 on the pivotally-mounted arm 23, which is connected to the supply-circuit conductor 37 by a conductor 44.

A conductor 45 connects the supply-circuit conductor 37 to one end of each of the resistor members 13 and 14. The other terminal of the resistor member 13 is connected, through a conductor 46, to one terminal of the winding 34 of the relay 25. The other terminal of the resistor member 14 is connected, by a conductor 47, to one terminal of the magnet winding 35 of the relay 25. The other terminals of the windings 34 and 35 are connected together and to the supply-circuit conductor 38 by a conductor 48. The terminal member 27 of the relay 25 is connected, by a conductor 49, to one terminal of the magnet winding 21 of the switch 18. The terminal 28 of the relay member 25 is connected, by a conductor 50, to one terminal of the winding 19 of the switch 18. The terminal 29 is connected to conductor 37 by a conductor 51. The other terminals of the two windings 19 and 21 are connected together and to the supply-circuit conductor 38 by a conductor 52. It will be noted that the resistor member 14 is connected in series-circuit relation to the magnet winding 35 and that the resistor member 13 is connected, in series-circuit relation, to the magnet winding 34, and that these two respective sets of elements are connected in parallel-circuit relation relatively to each other and then to the two supply-circuit conductors 37 and 38.

Figure 3:
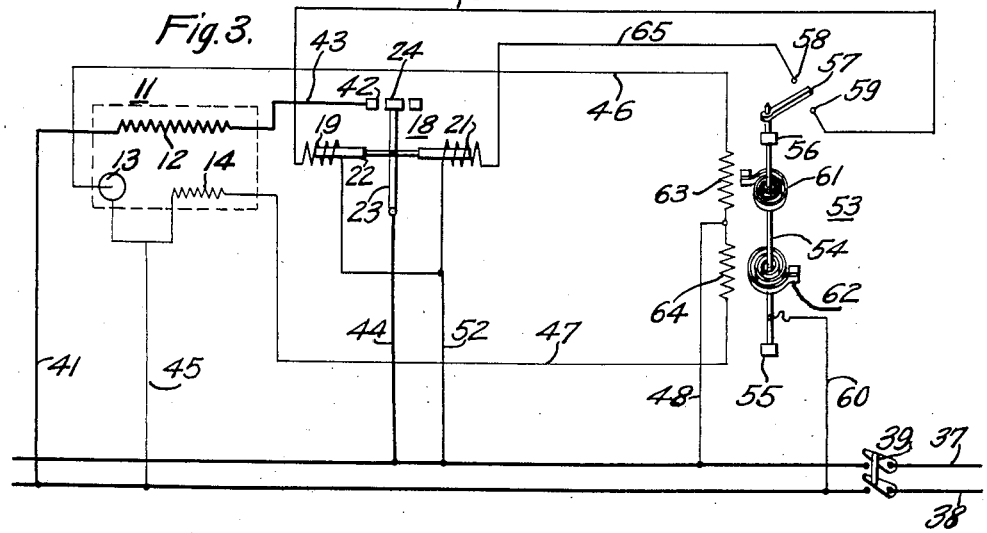
Fig. 3 is a diagram of connections of a modified temperature-control system embodying my invention.

Referring more particularly to Fig. 3 of the drawings, an electric furnace or other electrically-heated appliance 11, has associated therewith a heating element 12, a salt thermostat 13 having a negative temperature coefficient of resistance, and a central resistor member 14 having a positive temperature coefficient of resistance.

A plural-position switch 18 comprises a pivotally mounted arm 23 having a contact terminal member 24 at the movable end thereof which is adapted to operatively engage or be disengaged from a stationary contact terminal member 42. A two-part armature member 22 is pivotally mounted on the arm 23 and is selectively energized by magnet windings 19 and 21, located substantially as described heretofore in connection with Fig. 1.

A relay member 53 comprises a shaft 54 mounted in suitable bearing members 55 and 56 and having a contact lever arm 57 secured thereto adjacent one end thereof which is adapted to selectively engage adjustable contact members 58 and 59. The shaft 54 is electrically connected to conductor 38 by a conductor 60. A plurality of spirally-coiled oppositely-disposed bi-metallic strips 61 and 62 are connected to the shaft 54 and are so adjusted relatively to each other that the lever arm 57 occupies a position intermediate the two contact members 58 and 59 when the system is not energized. A plurality of heating coils 63 and 64 are located respectively adjacent to the bi-metallic strips 61 and 62 to thermally influence the same, as will be hereinafter described more in detail.

Supply-circuit conductors 37 and 38 control the energization of the system through a manually-operable switch 39. One end of the heating coil 12 is connected to the conductor 38 by a conductor 41, while the other end of the element 12 is connected to the substantially stationary contact terminal 42 by a conductor 43. A conductor 45 connects the supply-circuit conductor 38 to one terminal of each of the variable-resistance members 13 and 14. The other terminal of the member 13 is connected to one terminal of the heating coil 63 by a conductor 46. The other terminal of the resistance member 14 is connected to one terminal of the heating coil 64 by a conductor 47. The other terminals of the coils 63 and 64 are connected together and to the supply-circuit conductor 37 by a conductor 48. The contact member 58 is connected to one terminal of the magnet winding 21 by a conductor 65, while the contact member 59 is connected, by a conductor 66, to one terminal of the magnet winding 19. The other terminals of the windings 19 and 21 are connected together and to the supply-circuit conductor 38 by a conductor 52. The lever arm 23 is connected to the supply-circuit conductor 37 by a conductor 44.

Referring more particularly to Fig. 4 of the drawings, an electric furnace or other device 11 has operatively associated therewith a heating element 12, a salt thermostat 13 and a resistor member 14, substantially as hereinbefore described.

A plural-position switch 18 is provided and comprises substantially the same members as hereinbefore described in connection with Figs. 1 and 3.

A relay member 67 comprises a lever arm 68 pivotally mounted intermediate its ends and provided, at each end, with contact members 69. A plurality of magnetizable cores 71 are operatively connected to the two arms of the lever 68 intermediate the pivot and the outer ends, and are selectively energized by magnet windings 34 and 35 operatively associated therewith. A spring 36 holds the lever in its neutral position when neither of the windings 34 and 35 is energized.

Supply-circuit conductors 37 and 38 and a manually-operable switch 39 are provided to control the energization of the entire system. A conductor 41 connects one terminal of the element 12 to the supply-circuit conductor 38, while the other terminal is connected, by a conductor 43, to a substantially stationary contact terminal member 42. A conductor 72 connects one terminal of the salt theremostat 13 to the supply-circuit conductor 38, which is also connected, by a conductor 73, to one terminal of the magnet winding 34 of the relay 67. A conductor 74 connects the supply-circuit conductor 37 to one terminal of the resistor member 14, and a conductor 75 connects the same supply-circuit conductor to one terminal of the magnet winding 35. The other terminals of the magnet windings 34 and 35 are connected together and to the other ends of the resistor members 13 and 14 by a conductor 76. The resistor member 13 is connected, substantially in series-circuit relation, to the resistor member 14, and the magnet windings 34 and 35 are connected, in series-circuit relation, to each other, while the conductor 76 connects the common terminals of the two sets of members, so that the salt thermostat 13 is connected in parallel-circuit relation to the magnet winding 34, while the resistor member 14 is connected in parallel-circuit relation to the magnet winding 35. A conductor 51 connects the supply-circuit conductor 37 to the pivotally mounted lever arm 68.

A substantially stationary contact member 77 is operatively engaged by, or disengaged from, one of the contact terminals 69 and is connected to one terminal of the magnet winding 21 by a conductor 78. A stationary contact member 79 is so located as to be operatively engaged by, or disengaged from, the terminal member 69 on the other end of the lever arm 68, and is connected, by a conductor 81, to the terminal end of the magnet winding 19. The other ends of the windings 19 and 21 are connected together and to the supply-circuit conductor 38 through a conductor 52.

Referring more particularly to Fig. 5 of the drawings, an electric furnace or other electrically-heated device 11 has associated therewith a heating element 12, a salt thermostat 13, and a resistor member 14 substantially as hereinbefore described. A plural-position switch 18 controls the energization of the heating element 12, as hereinbefore described in connection with Figs. 1, 3 and 4.

A relay member 53 is provided substantially as described in connection with Fig. 3 of the drawings, and operates in substantially the same manner. The salt thermostat 13 has one of its terminals connected to the supply-circuit conductor 37 through a conductor 82, and a conductor 83 connects the same supply-circuit conductor to one terminal of a heating coil 64. One end of the resistor member 14 is connected to one terminal of the heating coil 63 by a conductor 84 and to the supply-circuit conductor 38 by a conductor 85. The other terminals of the heating coils 63 and 64 and of the resistor members 13 and 14 are connected together and to each other through a conductor 76.

Referring to the system illustrated in Fig. 1 of the drawings, the various elements are there shown in their normal inoperative positions. If the switch 39 is closed to energize the system, an appreciable current will traverse the circuit comprising the resistor member 14 and the magnet winding 35, flowing from supply-circuit 37 through conductor 45, resistor 14, conductor 47, winding 35 and conductor 48 to the supply-circuit conductor 38. Only a relatively small current will traverse the circuit comprising the conductor 45, salt thermostat 13, conductor 46, winding 34 and conductor 38. This is for the reason that, at normal temperatures, the resistance of the salt thermostat 13 is relatively very high, thus permitting only a relatively very small current to flow therethrough. The current traversing the magnet winding 35 energizes the same and causes it to draw the core member 33 against the action of the spring 36, whereby a tilting or turning movement of the tube 26 on its pivot is obtained, resulting in a circuit being established substantially as follows:— from the supply-circuit conductor 37 through conductor 51 to the intermediate terminal member 29, through the conducting fluid 31 to terminal member 28 and through conductor 50, winding 19 and conductor 52 to supply-circuit conductor 38. The energized winding 19 attracts its co-operating core member 22, causing the lever arm 23 to have a turning movement on its pivot and causing the contact member 24 thereon to engage the stationary terminal member 42, whereby an energizing circuit through the heating element 12 is established substantially as follows:—from supply-circuit conductor 37 through conductor 44, lever arm 23, contact terminals 24 and 42, conductor 43, heating element 12 and through conductor 41 to supply-circuit conductor 38.

If the temperature of the furnace or device exceeds a predetermined value, the electrolyte 16 in the salt thermostat 13 fuses, causing a relatively very great reduction of resistance of the salt thermostat and permitting a relatively large current to traverse the circuit comprising the salt thermostat 13 and the magnet winding 34 of the relay 25. The winding 34 attracts the core 32, causing a turning movement of the tube 26 on its pivot, whereby the conducting fluid 31 is disengaged from the terminal 28 and is caused to operatively engage terminal 27, thereby interrupting the originally established control circuit through the winding 19 and establishing another control circuit substantially as follows:—from the supply-circuit conductor 37 through conductor 51, terminal 29, conducting fluid 31, terminal 27, conductor 49, winding 21 and through conductor 52 to the supply-circuit conductor 38. This causes a turning movement of the lever 23 in a clockwise direction (as illustrated in Fig 1 of the drawings), whereby contact member 24 is caused to be operatively disengaged from contact member 42 whereby the energizing circuit through the heating element 12 is interrupted. If the temperature of the furnace 11 decreases a substantial amount, the resistance of the salt thermostat 13 again increases, thereby reducing the current therethrough to a relatively small amount, whereupon the control circuit through the magnet winding 34 is interrupted and the first-described control circuit through the magnet winding 35 is again established.

Referring particularly to Fig. 3, the operation of this system is substantially like that described above in connection with Fig. 1, except that the control circuits do not comprise a magnetizing winding but do comprise heating coils which selectively influence the bi-metallic strips 61 and 62. As soon as the switch 39 is closed, an appreciable current traverses a control circuit comprising conductors 45, resistor 14, conductor 47, heating coil 64 and conductor 48. The construction of the relay comprising particularly the shaft 54 and the bi-metallic strips 61 and 62 is such that, when the coil 64 is heated and thermally influences the strip 62, the shaft 54 is given a turning movement in its bearings so that the lever arm 57 operatively engages the contact terminal member 59. A control circuit is established through a conductor 60, shaft 54, lever arm 57, terminal 59, conductor 66, magnet winding 19 and conductor 52. The switch lever 23 is so moved that the contact terminal 24 operatively engages the contact terminal 42 and establishes an energizing circuit through the heating element 12 substantially as hereinbefore described in connection with the system illustrated in Fig. 1.

If the temperature of the device 11 exceeds a predetermined value, the resistance of the salt thermostat 13 is very greatly reduced, and an appreciable current will traverse it and the following circuit: from supply-circuit conductor 38, through conductor 45, salt thermostat 13, conductor 46, heating coil 63 and through conductor 48 to supply-circuit conductor 37. The current traversing the salt thermostat 13 and the coil 63 is now relatively much greater than that traversing the resistor 14, and the heating coil 64, and the bi-metallic strip 61 is, therefore, effective to first cause the lever arm 57 to be operatively disengaged from the contact terminal 59 and then to operatively engage the contact terminal 58, whereby a new control circuit is established substantially as follows: from supply-circuit conductor 38, through conductor 60, shaft 54, arm 57, terminal 58, conductor 65, winding 21 and through conductor 52 to supply-circuit conductor 37. The lever arm 23 is given a turning movement in a clockwise direction, thereby causing the energizing circuit through the heating element 12 to be interrupted. As soon as the temperature of the furnace or device 11 has dropped a predetermined amount, the resistance of the salt thermostat 13 again increases, whereby the current through the heating coil 63 is very greatly reduced, causing the bi-metallic strip 62 to direct the movement of the shaft and arm 57 and to again close the hereinbefore-described control circuit operative to permit of energizing the heating element 12.

Referring more particularly to the system illustrated in Fig. 4 of the drawings, the operation of the system is substantially the same as hereinbefore described, but the system illustrated in this and in Fig. 5 may be termed a voltage-controlled system in contradistinction to the systems illustrated in Figs. 1 and 3, which may be termed current-controlled systems. The salt thermostat 13 in this system is connected in parallel-circuit relation to magnet winding 34 and, when the switch 39 is closed, a relatively large potential drop will be established across the terminals of the salt thermostat 13 and, consequently, also across the terminals of the magnet winding 34. The drop of potential across the resistor member 14 is relatively very low and, therefore, the drop of potential across the terminals of the winding 35 is also relatively low. The current traversing the winding 34 is, therefore, relatively large, and the lever arm 68 of the relay 67 is given a turning movement in a counter-clockwise direction, whereby the terminal member 69 on the left-hand end thereof is caused to operatively engage the terminal member 79. This establishes a control circuit through a conductor 51, lever arm 68, terminal members 69 and 79, conductor 81, magnet winding 19 and, through conductor 52, to the supply-circuit conductor 37. The magnet winding 19, being energized, causes a turning movement of the lever 23 in a counter-clockwise direction, whereby the terminal member 24 is caused to operatively engage the terminal member 42, causing an energizing circuit to be established through the heating element 12.

If the temperature of the device or furnace 11 exceeds a predetermined value, the resistance of the salt thermostat 13 decreases very rapidly and the potential drop across the terminals thereof becomes relatively much less than that across the terminals of the resistor 14. The magnet winding 34 is, therefore, substantially de-energized, and the magnet winding 35 is energized by a relatively greater current traversing the same than heretofore. The lever arm 68 is, therefore, given a turning movement on its pivot in a clockwise direction, causing the interruption of the previously established control circuit and establishing another control circuit through conductor 51, right-hand end of lever arm 68, terminal member 69 mounted thereon, terminal member 77, conductor 78, winding 21 and, through conductor 52, to the other supply-circuit conductor. This results in a turning movement of the lever arm 23, whereby the circuit through the heating element 12 is interrupted. If the temperature of the salt thermostat 13 is reduced, its resistance again increases, as hereinbefore described, and the original control circuit is again established to cause energization of the heating element 12.

The system illustrated in Fig. 5 of the drawings operates in substantially the same manner as the system illustrated in Fig. 4, except that the magnet windings 34 and 35 are replaced by heating coils 64 and 63. When the switch 39 is closed to energize the entire system, the potential drop across the salt thermostat 13 is relatively very high and, therefore, the potential drop across the terminals of the coil 64 is also relatively high, causing a relatively large current to traverse the coil 64, which is effective to thermally influence the strip 62 to cause a turning movement of the shaft 54 whereby the free end of the lever arm 57 operatively engages the contact member 59. This establishes a control circuit through the magnet winding 19 of the switch 18, causing an energizing circuit to be established through the heating element 12, substantially as hereinbefore described in the other systems.

When the temperature of the device or furnace increases beyond a predetermined value, the potential drop across the terminals of the salt thermostat 13 becomes relatively low, whereby the current traversing the coil 64 is reduced and the current traversing the coil 63 is increased. The bimetallic strip 61 is, therefore, effective to cause a turning movement of the shaft 54, whereby the arm 57 is operatively disengaged from the terminal 59 and operatively disengages the contact member 58, thereby establishing the second control circuit through the magnet winding 21 of the switch 18, which is thereupon effective to de-energize the heating element 12.

The system embodying my invention provides a plurality of resistor members, one of which has a negative temperature coefficient of resistance, and the other of which has a positive temperature coefficient of resistance. It is not necessary that the temperature coefficient of resistance of the second member have a relatively high value, as it is possible to so design and proportion the various elements that a resistor member having a substantially constant resistance will be effective to operate substantially as described above, it being only necessary that the relative values of the currents traversing either the two magnet windings or the two heating coils of the relay be varied within relatively wide limits. This may be done with one resistor element having a practically constant resistance and with a second resistance element having a negative temperature coefficient of resistance. The currents traversing either the magnet windings or the heating coils of the relays may be made relatively small, as the movable members of the relay may be made relatively light and still carry sufficient current to energize the magnet windings of the plural-position electromagnetic switch to cause it to be actuated to close and to interrupt the circuit through the heating element.

Various modifications of the invention may be made within the spirit and scope thereof, and I desire, therefore, to be limited only by the scope of the appended claims.

I claim as my invention:—

1. In a temperature-control system, in combination, an electric-heating element, electric switching means for controlling the energization of said heating element, a plurality of normally balanced and opposing controlling means for said switching means, and a plurality of thermally-influenced means for selectively energizing said switch-controlling means.

2. In a temperature-control system, in combination, an electric-heating element, electric switching means for controlling the energization of said heating element, a relay for governing the operation of said switching means comprising a plural-position switch normally held in its inoperative position, and means controlled by the temperature of said heating element for selectively actuating said plural-position switch to one of its operative positions.

3. In a temperature-control system, in combination, an electric-heating element, electric switching means for controlling the energization of said heating element, a relay for governing the operation of said switching means comprising a plural-position switch normally held in its inoperative position, a plurality of means for selectively actuating said plural-position switch to one of its operative positions, and a plurality of means thermally controlled by said heating element for controlling said actuating means.

4. In a temperature-control system, in combination, an electric-heating element, electric switching means for controlling the energization of said heating element, and a relay for governing the operation of said switching means comprising a plural-position switch normally held in its inoperative position, a plurality of means for selectively actuating said plural-position switch to one of its operative positions, a resistance element having normally a relatively low resistance and a positive temperature coefficient of resistance, and a second resistance element having normally a relatively high resistance and a negative temperature coefficient of resistance, said two resistance elements being electrically connected to each other to govern the operation of said actuating means.

5. In a temperature-control system, in combination, an electric-heating element, electric switching means for controlling the energization of said heating element, and a relay for governing the operation of said switching means comprising a plural-position switch normally held in its inoperative position, a plurality of means for selectively actuating said plural-position switch to one of its operative positions, and a plurality of variable-resistance resistor elements for governing the operation of said actuating means.

6. In a temperature-control system, in combination, an electric-heating element, electric switching means for controlling the energization of said heating element, and a relay for governing the operation of said switching means comprising a plural-position switch normally held in its inoperative position, a plurality of means for selectively actuating said plural-position switch to one of its operative positions, and a plurality of resistor elements, the resistance of which varies inversely to each other with changes of temperature, for governing the operation of said actuating means.

7. In a temperature-control system, in combination, an electric-heating element, electric switching means for controlling the energization of said heating element, a relay for governing the operation of said switching means comprising a plural-position switch, and means directly controlled by the temperature of said heating element and in circuit with the plural-position switch for the selective control thereof.

8. In a temperature-control system, in combination, an electric-heating element, electric switching means comprising a pivoted contact member and a pair of oppositely-disposed actuating electromagnets for controlling the energization of said heating element, a relay for governing the operation of said switching means comprising a plural-position switch for selectively energizing the electromagnets, and means directly controlled by the temperature of said heating element and in circuit with the plural-position switch for the selective actuation thereof.

9. In a temperature-control system, in combination, an electric-heating element, electric switching means for controlling the energization of said heating element, and a relay for governing the operation of said switching means comprising a plural-position switch, a plurality of means for selectively actuating said plural-position switch to one of its operative positions, and a plurality of variable-resistance resistor elements for governing the operation of said actuating means.

10. In a temperature-control system, in combination, an electric-heating element, electric switching means for controlling the energization of said heating element, and a relay for governing the operation of said switching means comprising a plural-position switch normally held in its inoperative position, a plurality of means for selectively actuating said plural-position switch to one of its operative positions, and a plurality of variable-resistance resistor elements for governing the operation of said actuating means, one of said selective actuating means and one of said resistor elements being connected in circuit with each other in such manner that they are continuously energized regardless of the position of the relay or plural-position switch.

In testimony whereof, I have hereunto subscribed my name this 5th day of July 1922.

HOWARD A. HANDS.